United States Patent
Katagiri et al.

[15] 3,661,671
[45] May 9, 1972

[54] METHOD OF MANUFACTURING AN IMPROVED SIMULATED LEATHER AND THE LEATHER PRODUCT MANUFACTURED THEREFROM

[72] Inventors: Keizo Katagiri; Kenji Kuroishi; Kazuchika Nakamura; Katsutoshi Hagiwara, all of Katsuta, Japan

[73] Assignee: Nippon Kakoh Seishi K.K., Tokyo, Japan

[22] Filed: Feb. 20, 1970

[21] Appl. No.: 13,207

[30] Foreign Application Priority Data

Feb. 21, 1969 Japan..................................44/12513

[52] U.S. Cl...............................156/78, 156/272, 156/244
[51] Int. Cl..........................................................B32b 5/18
[58] Field of Search..............156/78, 79, 244, 272; 161/160, 161/DIG. 2

[56] References Cited

UNITED STATES PATENTS

| | | | |
|---|---|---|---|
| 3,255,061 | 6/1966 | Dobbs | 156/79 |
| 3,262,805 | 7/1966 | Aoki | 156/79 |
| 3,123,508 | 3/1964 | Waugh | 156/78 |
| 3,391,044 | 7/1968 | Kaghan et al. | 156/272 |
| 3,239,399 | 3/1966 | King | 156/272 |

*Primary Examiner*—Carl D. Quarforth
*Assistant Examiner*—S. R. Hellman
*Attorney*—Kelman and Berman

[57] ABSTRACT

Method of manufacturing an improved simulated leather and the product leather are described. In the method, a low-foam polyolefin sheet is quenched immediately after its emergence from an extrusion die and the quenched side of said sheet is subjected to corona discharge.

An adhesive agent is applied to the treated side and, after drying, a thermoplastic synthetic resin film or sheet is laminated to said surface.

7 Claims, No Drawings

METHOD OF MANUFACTURING AN IMPROVED SIMULATED LEATHER AND THE LEATHER PRODUCT MANUFACTURED THEREFROM

BACKGROUND OF THE INVENTION

1. Field of the Invention

This invention relates to a method of manufacturing a simulated leather comprised of a polyolefin foam having a thermoplastic resin film or sheet laminated thereon, and to the simulated leather that is obtainable by said method.

2. Description of the Prior Art

It is well known that polyolefin foams are manufactured by impregnating polyolefins, such as polypropylene, polyethylene, etc., with a foaming agent, solvent and other additives and that those foams are used in the manufacture of bags and cases, sandal tops and other formed articles. However, because of the disadvantage that it is not conducive to the color tones required of such end products as bags, cases and footwear, it has been common practice to laminate the foam to other resin films or sheets. The trouble is that the nonpolarity of polyolefins prevents them from affording adequate bonding strength.

The conventional foamed polyolefin sheets, particularly those of foamed polyethylene, are too porous to be colored attractive shades, besides being vulnerable to scratches and abrasion. To overcome those shortcomings, there has been suggested a method wherein the surface of foamed polyethylene is covered with a composition based on a thermoplastic resin such as polyvinyl chloride resin through the intermediary of an adhesive agent in order to impart adequate scratch and wear resistance to the foam, as well as for the purpose of improving the color appeal of the product. It has so far been found, however, that only an inadequate bond can be obtained between foamed polyolefin and a thermoplastic resin sheet to yield a practically unsuitable product.

SUMMARY OF THE INVENTION

It is an object of the invention to provide a method for overcoming the foregoing disadvantages.

Another object is to provide simulated leather which is scratch and abrasion-resistant and has an attractive color tone.

The invention, therefore, relates to a method for producing an improved simulated leather consisting in a foamed polyolefin having a surface covering of a thermoplastic resin film or sheet, such as of polyvinyl chloride, vinyl chloride-vinyl acetate copolymer, ethylene-vinyl acetate-vinyl chloride terpolymer, polyurethane, polyamide or polyamino acid resin, said foamed polyolefin having a foaming rate of 1.5 to 3 times, or an apparent density in the range from 0.3 to 0.6 g/cm$^3$. In a second aspect, the invention relates to the simulated leather so produced.

DETAILED DESCRIPTION OF THE INVENTION

In the method of the instant invention, a polyolefin sheet surface which has been treated under the particular set of conditions to be described hereinafter is joined with a thermoplastic resin film or sheet through the intermediary of an adhesive agent to produce a firmly bonded laminate. Polyolefin resins generally are non-polar polymers and accordingly afford only a poor affinity for other resins. As a result, to impart polarity to the former polymers, the surfaces of such resins are conventionally treated by corona discharge. It is also an established art to use polyurethane resin as said adhesive agent. Actually, however, even if a foamed polyolefin sheet is treated by corona discharge and, then, laminated to a polyvinyl chloride-based composition with the aid of such an adhesive, no adequate bonding strength can be expected.

The term 'polyolefin' as used herein means any and all of polyethylene, polypropylene, and ethylene-propylene copolymer, but for the convenience of explanation, the invention will hereinafter be particularly described by reference to polyethylene, it being understood, however, that the invention is by no means limited to the art and product involving polyethylene alone.

Polyethylene beads are impregnated with a low-boiling solvent at atmospheric or slightly elevated pressure, followed by the addition of an organic foaming agent and inorganic one and, if necessary, of a pigment. The formulation is inflation-extruded into a foamed polyethylene sheet at a temperature above a softening point thereof. In this operation, immediately after the hot sheet emerges from the die assembly, one side of the sheet is brought into contact with a water-cooling tube surface. This quench may be accomplished as well by immersing the sheet in cooling water, in which case both sides of the sheet are quenched. In the latter case, no adverse effect is found, either, on the quality of the sheet. The above novel finding has given impetus to the development of the instant invention.

The quenching of a sheet is carried out under the following conditions:

| | |
|---|---|
| tube-cooling temperature | 4–15°C |
| sheet moving speed | 3–6 m/min |
| cooling time | 10–15 sec. |

If a foamed polyethylene sheet is allowed to cool in the air gradually after its emergence from the extruder, the resulting cell structure of the sheet is different from that of a similar film which has been quenched. This finding is supported by microscopic examination of a cross section of the sheet.

Thus, whereas the cell structure of the quenched side is similar to that of the inner sheet portion, the gradually cooled sheet does not show cells on the cooled surface.

In the latter sheet, the cells exist only under a skin. A bonding strength test was conducted to evaluate the relative merits of the two cell structures. Each test piece was treated by corona discharge and, then, coated with a thermosetting polyurethane resin coating composition. After drying, a flexible polyvinyl chloride film or sheet was laminated onto the coated surface of the test piece over rollers. The bonding strength of the laminate was measured by means of a tension tester at 200 mm/min. It was found that whereas the gradually cooled sample showed a strength value of 1.5 – 3.0 kg/3 cm, the quenched sample of the invention had a value greater than 8.0 – 9.0 kg/3 cm (The foamed polyethylene layer failed at the above value).

Corona discharge is carried out under the following conditions:

| | |
|---|---|
| distance between the electrodes | 2–3 mm |
| high-frequency voltage | 1.5–5 KV |
| high-frequency current | 0.5–1.2 A |
| sheet moving speed | 3–6 m/min. |

However, it was also found that some quenched samples prepared by buffing the surface of the polyethylene foam to expose the cells and subjecting the surface to a corona discharge gave a low bond strength value of 2 to 3 kg/3 cm.

It is therefore not that the surface cells are the exclusive factor in the improved bond strength, but the crystallinity of the material polyethylene also appears to be responsible for the improvement. A synergistic effect of this crystallinity with corona-discharge treatment is a probable cause.

The invention will be further described in detail with reference to a preferred example thereof.

A low-foam polyethylene having a foaming rate from 1.5 to 3 times was employed. That is, it had an apparent density of 0.3 to 0.6 g/cm$^3$. This polyethylene was extruded at a temperature substantially higher than its softening point and quenched, and the quenched side of the sheet was subjected to a corona discharge. Separately, an isocyanate-modified polyester coating composition (solid 20 percent) is admixed with a trifunctional isocyanate compound, followed by the addition of ethyl acetate. The mixture is stirred well, and after viscosity adjustment with ethyl acetate, the adhesive is applied to the sheet with a doctor knife at the rate of 30 to 40 g/m². Then, a plasticizer, stabilizer, pigment and other conventional additives are incorporated into polyvinyl chloride resin to prepare a flexible polyvinyl chloride compound in a blender, and the mixture is further mixed in a Banbury mixer. The mixture is then fed to a calender. The resulting film, 0.15 to 0.2 mm thickness, was immediately laminated onto the coated side of the polyethylene foam, and if necessary, the laminate is embossed. The foregoing procedure yields a firm bond between the polyethylene foam and flexible polyvinyl chloride film, and the resulting simulated leather had an attractive shade and a sufficient scratch and abrasion resistance.

The following working examples will further illustrate the invention. In the examples, all parts are by weight.

EXAMPLE 1

Polyethylene of the following formulation was extruded under the conditions given below.

Formulation:

| | |
|---|---|
| polyethylene (density 0.92, M.I. (melt index) 1.2) (containing petroleum ether) | |
| azoisobutyrodinitrile | 100 parts |
| citric acid | 0.10 parts |
| sodium bicarbonate | 0.30 parts |
| pigments | 3.0 parts |

One side of the resulting sheet of foamed polyethylene was quenched from the die temperature of 160° C., while moving at 4 m/min by contact with a, cooling tube having a temperature of 10° C. for 15 sec. and subjected to corona discharge from between electrodes spaced 2 mm at 2 KV and 0.8 A while moving at 4 m/min. High-Frequency Electrical Appliances 3 KW Type (as manufactured and marketed by Kasuga Electric Co., Ltd.) was used as the power source. The following adhesive composition was coated onto the treated surface with a doctor knife.

| | |
|---|---|
| Hydroxy terminated mixed polyester prepolymer modified with diisocyanate (Trade name BOSTIC 4154, as produced and marketed by Bostic Japan, Ltd.) | 20 parts |
| Hexanetriol-tritolylene diisocyanate (Trade name BOSCODUR R, as produced and marketed by Bostic Japan, Ltd.) | 2 parts |
| Ethylacetate | 56 parts |
| Toluene | 8 parts |

The coating rate of the adhesive composition was 30 g/m², and the coated sheet was dried in a furnace at 100° – 120° cC. Thereafter, the following flexible compound was sheeted out into a thickness of about 0.15 mm and laminated onto the adhesive surface of said coated sheet.

| | |
|---|---|
| Polyvinyl chloride resin (Trade name $\overline{P}$ (polymerization degree) = 1050, as produced and marketed by Mitsui-Tohatsu, Ltd.) | 100 parts |
| Dioctyl phthalate | 40 parts |
| Stabilizers | |
| Cd—stearate | 2 parts |
| Ba—stearate | 1 part |
| Epoxy—soybean oil | 2 parts |
| Pigments | 3 parts |

The bonding strength of the laminate, as measured by the method described above, was greater than 8.0 kg/3 cm. It was also found that the foam was spoiled.

EXAMPLE 2

A polypropylene composition of the following formulation was extruded under the conditions given below.

Formulation:

| | |
|---|---|
| polypropylene (density 0.94, M.I. 0.3) containing liquid propane) | 100 parts |
| Azodicarbonamide | 0.1 part |
| Cadmium stearate | 0.5 parts |

One side of the resulting foamed sheet was quenched from a die temperature of 230° C., while moving at 5 m/min by contact with a cooling tube at 5° C. during 12 sec, and subjected to corona discharge from electrodes spaced 2 mm at 2.5 KV and 0.6 A. The same adhesive composition, drying and coating as in Example 1 were applied, and the coated sheet was laminated onto the following composition into a thickness of 0.15 mm on a calender.

Composition:

| | |
|---|---|
| vinyl chloride-vinyl acetate (95/5) copolymer, ($\overline{P}$ = 1300) | 100 parts |
| Dioctyl phthalate | 15 parts |
| Dibutyl phthalate | 15 parts |
| Cd—stearate | 2 parts |
| Ba—stearate | 1 part |
| Epoxy—soybean oil | 3 parts |
| Pigments | 3 parts |

The resulting product was embossed. The bonding strength was greater than 8.0 kg/3 cm. It was also found that the foam was spoiled.

EXAMPLE 3

One side of the same foamed polyethylene sheet as in Example 1 was quenched by passage through a water-cooling bath from a die temperature of 240° C. at 5 m/min. The cooling water temperature was 10° C., and the cooling time 12 sec. One side of the quenched sheet was subjected to corona discharge as in Example 1. The same adhesive composition, drying and coating as in Example 1 were applied, and the following composition was the same process by in Example 1.

Composition:

| | |
|---|---|
| Ethylene-acetate-vinyl chloride graft terpolymer | 100 parts |
| Dioctyl phthalate | 10 parts |
| Stearic acid | 0.3 parts |
| Cd—stearate | 2 parts |
| Ba—stearate | 1 part |
| Pigments | 3 parts |

The resulting product was embossed. The bonding strength was greater than 8.0 kg/3 cm. It was also found that the foam was spoiled.

EXAMPLE 4

The following solution was spread on the adhesive coated sheet surface of polyethylene foam as in Example 1 with a doctor knife at the rate of 150 g/m².

| | |
|---|---|
| Acryloid A-101 (acrylic resin, Rohm & Haas-made) | 40 parts |
| Vinyl chloride-vinyl acetate (85/15) copolymer ($\overline{P}$ = 800) | 20 parts |
| Cellulose acetate—butylate | 5 parts |
| Dioctyl phthalate | 20 parts |
| Pigments | 17 parts |
| Methyl ethyl-ketone | 180 parts |
| Ethyl acetate | 80 parts |

The coated sheet was dried at 100° – 120° C., and finally embossed at 160° C. The resulting product was satisfactory as the product obtained according to the method in Example 1.

EXAMPLE 5

The following ingredients for a nylon sheet were dissolved in a water bath at 70° C. and cooled.

| | |
|---|---|
| N-methoxy-Nylon (Methoxy content 7.0%) | 40 parts |
| Santicizer-8 (Toluene sulphonic acid derivative) | 4 parts |
| Toluene | 36 parts |
| Methanol | 112 parts |
| Water | 16 parts |
| Citric acid | 1.2 parts |
| Pigments | 8 parts |

The composition was cast onto a sheet of release paper coated with melamine resin to a thickness of about 0.1 mm to about 150 g/m², and dried at 110° C. A sample of the same polyethylene sheet foam as in Example 1 was quenched and treated by corona discharge in the same manner as in Example 3 and was coated with the same adhesive composition as in Example 1, whereupon it was heated to about 120° C. Thereafter the sample was laminated onto the nylon sheet, while said sheet of release paper was peeled off. The product was embossed at 120° C. The bonding strength was very good.

EXAMPLE 6

The following materials were dissolved in ethylacetate and the solution was adjusted to 5,000 c.p. to 7,000 c.p.

| | |
|---|---|
| Desmolin N (HO-terminated mixed polyester prepolymer modified with diisocyanate) | 22.5 parts |
| Desmodur R (Triphenylmethane 4, 4'', 4'''tri-isocyanate) | 3.8 parts |
| Desmorapid TTS (Tertiary polyamine) | 3.8 parts |
| Titanium dioxide (rutile type) | 2 parts |
| Pigments | 1.5 parts |

The solution was treated in a manner similar to the method followed in Example 5. The bonding strength was excellent.

EXAMPLE 7

The following composition was treated in a manner similar to the method followed in Example 5

| | |
|---|---|
| Poly γ-methylglutamate (Polyaminoacid resin, 10% solution in trichlor-ethane, Trade name Aji-Coat-200, as produced and marketed by Ajinomoto Co., Ltd.) | 100 parts |
| Pigments | 10 parts |

The bonding strength was very good.

CONTROL EXAMPLE

As a control, foamed polyethylene was allowed to cool at room temperature (25° C.). Otherwise, it was treated in the same manner as Example 1.

The bonding strength of the resulting laminate, as measured in the manner hereinbefore described, was 2.2 – 2.9 kg/3 cm, or an average of 2.5 kg/3 cm.

On the other hand, when the corona discharge treatment was omitted from the procedure of Example 1, the foam could not be bonded to flexible polyvinyl chloride.

What is claimed is:

1. A method of manufacturing a laminate which comprises:
   a. extruding a sheet of polyolefin foam having an apparent density of 0.3 to 0.6 g/cm³ from a die at a temperature substantially higher than the softening point of said polyolefin;
   b. quenching a face of the extruded sheet from said temperature at a rate sufficient substantially to maintain the cell structure of the extruded foam in the quenched face;
   c. subjecting said face to corona discharge until receptive to a thermosetting, synthetic-resin, adhesive composition;
   d. thereafter coating said face with said composition; and
   e. laminating a film of thermoplastic synthetic resin to the coated face at a temperature sufficient to set said composition.

2. A method according to claim 1, wherein said polyolefin is selected from the group consisting of polyethylene, polypropylene, and ethylene-propylene copolymer.

3. A method according to claim 1, wherein said thermoplastic synthetic resin is selected from the group consisting of polyvinyl chloride resin, vinyl chloride-vinyl acetate copolymer, ethylene-vinyl acetate-vinyl chloride terpolymer, polyurethane resin, polyamide resin and polyamino acid resin.

4. A method as set forth in claim 1, wherein said face is quenched by contact with a heat conductive solid surface having a temperature of 4° to 15° C. during at least 10 seconds.

5. A method as set forth in claim 4, wherein said face is quenched by contact with said surface while said sheet travels over said surface at a rate of 3 6 meter per minute.

6. A method as set forth in claim 5, wherein said contact is maintained for 10 to 15 seconds.

7. A method as set forth in claim 1, wherein said polyolefin is polyethylene and said sheet is extruded at 160° C.

* * * * *